Nov. 25, 1924.
G. HORNECKER
ADVERTISING DEVICE
Filed June 9, 1924    3 Sheets-Sheet 1
1,517,067
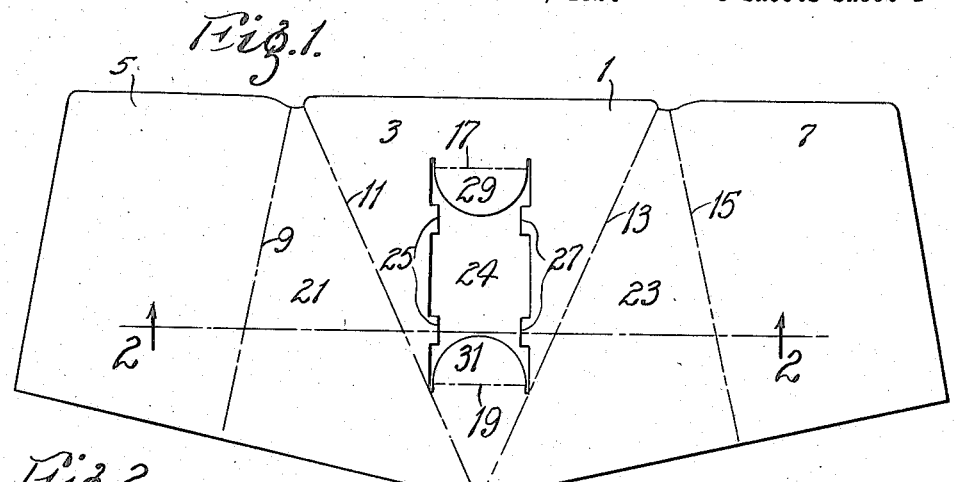
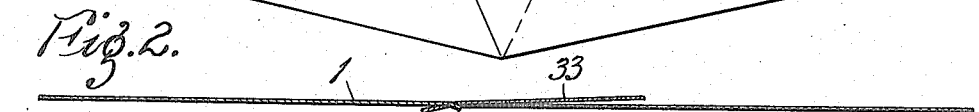
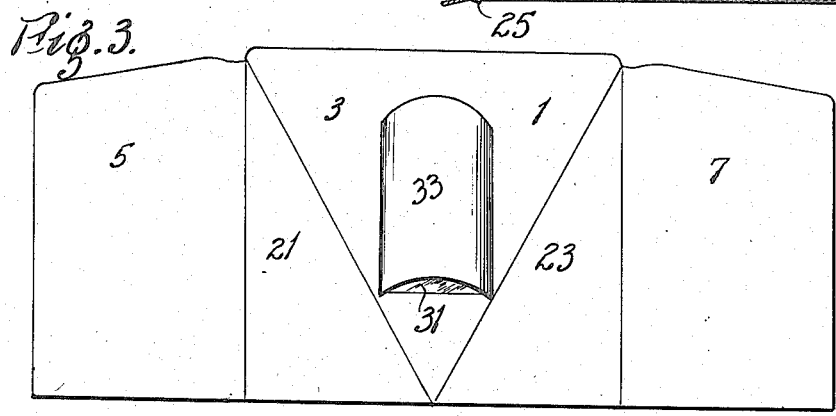
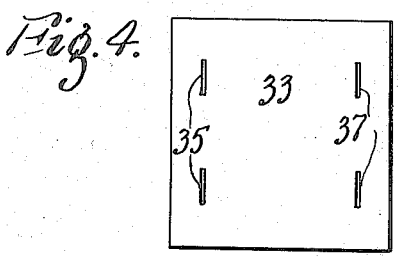
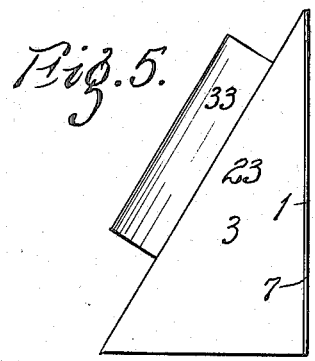
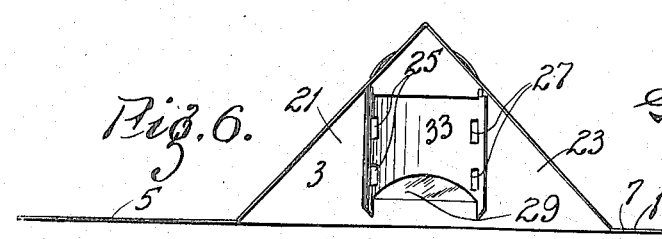

Nov. 25, 1924.
G. HORNECKER
ADVERTISING DEVICE
Filed June 9, 1924
1,517,067
3 Sheets—Sheet 2
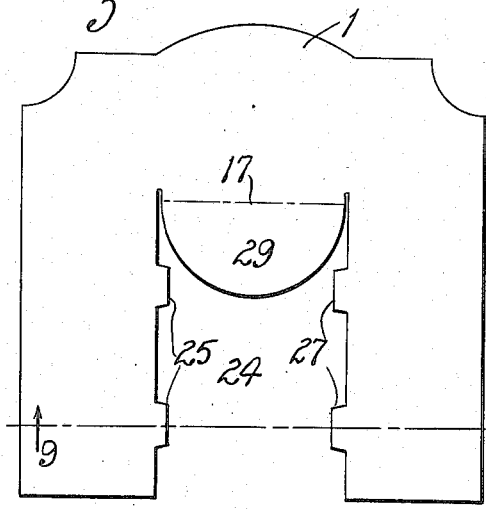
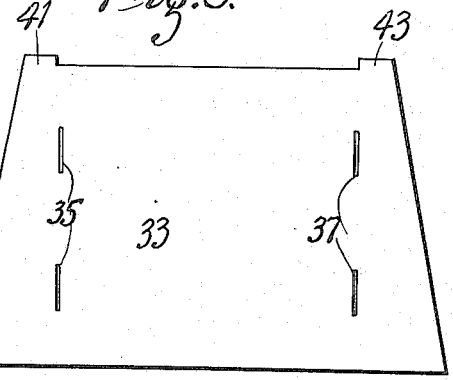
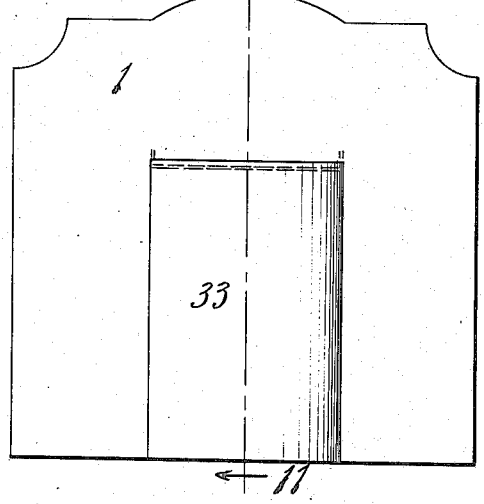
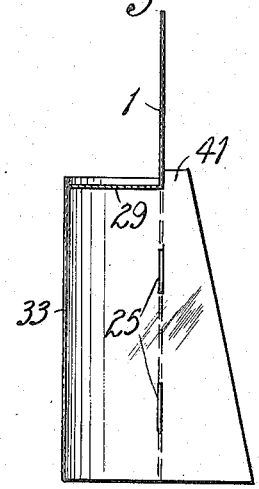
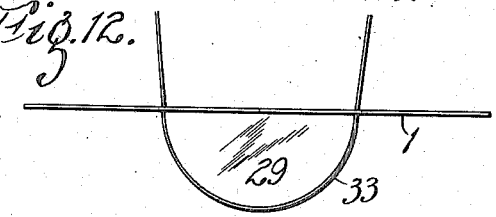

Nov. 25, 1924.
G. HORNECKER
ADVERTISING DEVICE
Filed June 9, 1924    3 Sheets-Sheet 3
1,517,067
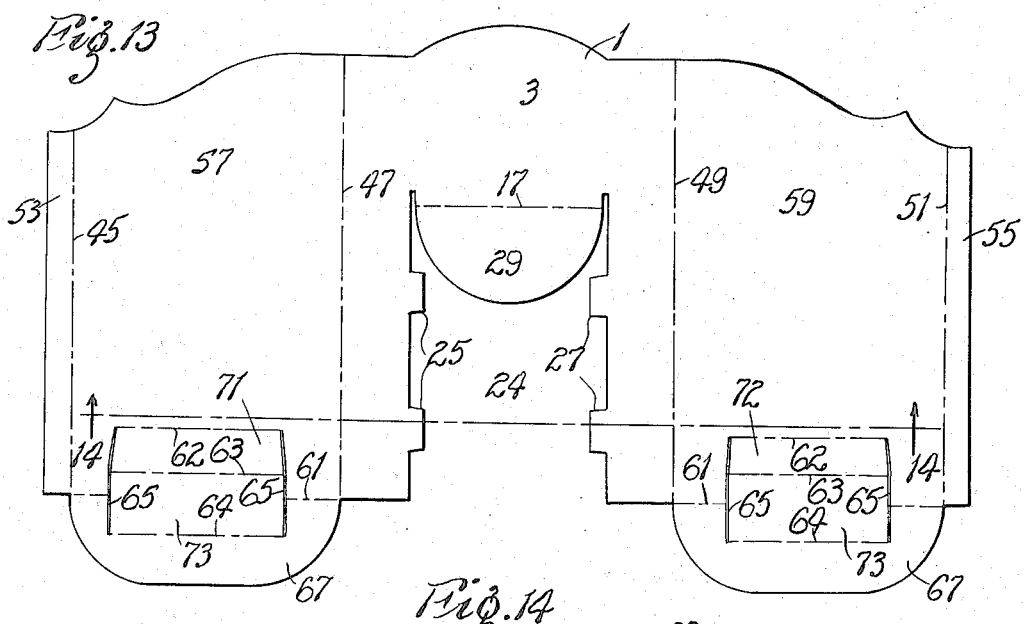
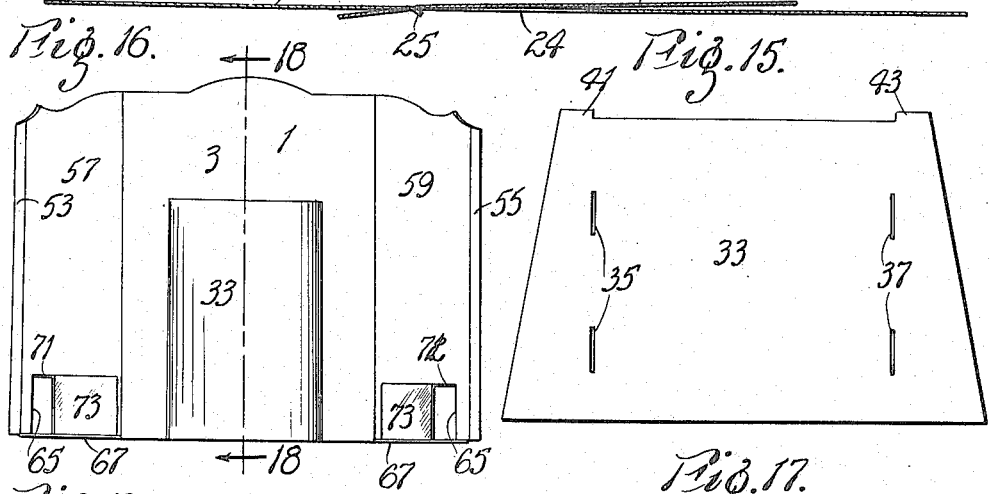
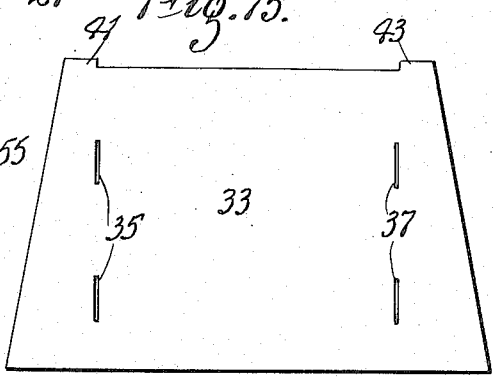
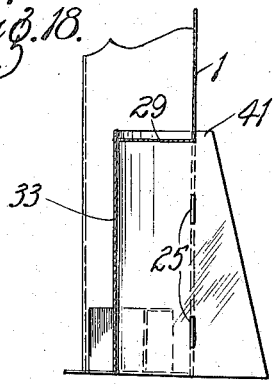
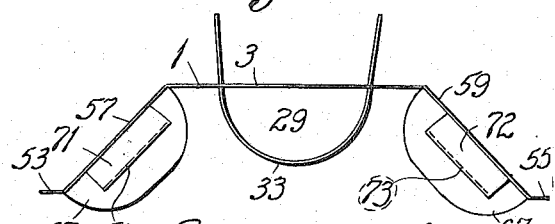

Patented Nov. 25, 1924.

1,517,067

UNITED STATES PATENT OFFICE.

GEORGE HORNECKER, OF ELMHURST, NEW YORK, ASSIGNOR TO L. R. CONWELL, OF ELMHURST, NEW YORK.

ADVERTISING DEVICE.

Application filed June 9, 1924. Serial No. 718,977.

*To all whom it may concern:*

Be it known that I, GEORGE HORNECKER, a citizen of the United States, and a resident of Elmhurst, Queens County, New York, have invented an Improvement in Advertising Devices, of which the following is a specification.

This invention relates to advertising devices, and with regard to certain more specific features, to a representation of a curved object, and a display support therefor.

Among the several objects of the invention may be noted the provision of a simple and inexpensive device for displaying a curved object, together with suitable legends; and the provision of a strikingly attractive device of this type which can be made from two blanks and shipped flat. Other objects will be in part obvious and in part pointed out hereinafter.

The invention accordingly comprises the features of construction, combinations of elements and arrangements of parts, which are exemplified in the description hereinafter in connection with the accompanying drawings, and the scope of the application of which will be indicated in the following claims.

In the accompanying drawings, in which are illustrated three of various possible embodiments, Fig. 1 is a face view of a preferred form of the support, shown flat;

Fig. 2 is a sectional view, from below, on the line 2—2 of Fig. 1, showing the support piece of Fig. 1 and with it the second piece, the two pieces being shown in a preferred arrangement for shipping;

Fig. 3 is a front elevation of the device in display position;

Fig. 4 is a face view of the second piece;

Fig. 5 is a right side elevation of Fig. 3;

Fig. 6 is a bottom view of Fig. 3;

Fig. 7 is a face view of a modified form of support, shown flat;

Fig. 8 is a face view of the second piece therefor;

Fig. 9 is a sectional view, from below, on the line 9—9 of Fig. 7, showing the support piece of Fig. 7 and with the second piece of Fig. 8, the two pieces being shown in a preferred arrangement for shipping.

Fig. 10 is a front elevation of the device in display position;

Fig. 11 is a transverse vertical section on the line 11—11 of Fig. 10, viewed from the right;

Fig. 12 is a bottom view of Fig. 10;

Fig. 13 is a face view of another modified form of support, shown flat;

Fig. 14 is a sectional view, from below, on the line 14—14 of Fig. 13, showing the support piece of Fig. 13 and with it the second piece of Fig. 15, the two pieces being shown in a preferred arrangement for shipping;

Fig. 15 is a face view of the second piece for the support shown in Fig. 13;

Fig. 16 is a front elevation of the device in display position;

Fig. 17 is a bottom view of Fig. 16; and

Fig. 18 is a transverse vertical section on the line 18—18 of Fig. 16, viewed from the right.

Figs. 16, 17 and 18 are on a smaller scale than Figs. 13, 14 and 15.

Similar reference characters indicate corresponding parts throughout the several views of the drawings.

Referring now more particularly to Figs. 1 to 6 of the accompanying drawings, there is illustrated at 1 a support formed of a single sheet of suitable material such as patent coated solid manila. For a size such as 18½x44 inches, a thickness of 25 points is suitable.

The device may take a variety of forms. In Figs. 1 to 6, the middle portion 3 of the device carries suitable legends (not shown) and may have various characteristics, such, for example, as those shown in the H. S. Jackson Patent 1,438,440, dated December 12, 1922.

The side portions 5, 7 stand at the rear of and at an angle to the main portion 3.

In making the device shown in Fig. 1, only two operations are required, namely, lithographing or equivalent and die cutting. The double lines 9, 11, 13, 15, 17 and 19 indicate scoring to facilitate bending of the device from the flat or shipping form shown in Figs. 1 and 2 to a display form shown in Figs. 3, 5 and 6.

Part of the support rests upon the floor or show-case or the like, in a plane in advance of the other parts of the base. This fact, coupled with the fact that the device is of one piece, with scoring converging toward the top to make the device stable, insures the stability and rigidity necessary for display purposes, when substantially thinner material is used than is ordinarily used for devices of similar size.

In the preferred construction there are four score lines 9, 11, 13, 15 which divide the article into five parts 5, 21, 3, 23, 7. The two outer score lines 9, 15 converge toward the top. The two inner score lines 11, 13 begin adjacent the upper end of the outer score lines 9, 15 and converge toward the bottom. The part 3 which is included between the inner score lines 11, 13 bears a suitable design and/or legend, such as the picture of a person or article or a suitable legend, and is inclined rearwardly when in display position. The parts 5, 7 which are on the outside of the outer score lines 9, 15 are in an approximately vertical position and substantially in alinement with each other when the device is set up for display. The intermediate parts 21, 23 which are on the outside of the inner score lines 11, 13 form an angle with the center part 3 and the outer parts 5, 7 and form the connecting links between the outer parts 5, 7 and the center part 3.

This center part is apertured at 24 and provided with tongues 25, 27 and foldable projections 29, 31, to cooperate with a second piece 33. This second piece is shown in face view in Fig. 4; in shipping position in Fig. 2; and in display position in Figs. 3, 5 and 6. This second piece is provided with slots 35 adapted to receive the tongues 25, and with slots 37 adapted to receive the tongues 27. This second piece 33 carries suitable legends (not shown) such as the representation of the pictures and other things upon the can or other cylindrical object that the second piece is intended to depict.

A preferred arrangement for shipping is shown in Fig. 2, wherein the second piece is shown as partly assembled upon the first piece. That is to say, the tongues 25 are in the slots 35. The device in this condition is flat, which permits economical shipping.

When the device thus partly assembled is to be set up for display, the operator or customer needs merely to bow the second piece 33 outwardly toward the front, retaining the tongues 25 in the slots 35. When the second piece is sufficiently bowed, the right end thereof (Fig. 2) is slipped through the right hand portion (Fig. 1) of the aperture 24, until the tongues 27 are in the slots 37. Then the semi-circular projections 29, 31 are bent forwardly from the plane of the middle part 3, until said projections are at a right angle to said plane. Said projections thus occupy the place of the top and bottom of the can or the like depicted by the second piece 33. These projections may have suitable legends such as pictures or the like depicting the top and bottom of the object that they are intended to advertise.

The support 1 is then bent into display position by bending along the score lines 9, 11, 13, 15 until the device takes the form shown in Figs. 3, 5 and 6.

It will be seen that no extraneous supports are required, and no gluing or expensive folding is required either in manufacture or installation of the article.

By having the sides of the article disposed to the rear of the central portion, the central portion and the cylindrical object thereon appear to stand out from the rest of the device and to present a striking appearance.

In Figs. 7 to 12 is shown a modified form in which the support is in a single plane when in display position, save for the projection 29 that depicts the top of the can or other object advertised. The second piece is provided at its upper corners with tongues 41, 43 that engage the rear side of the support (Fig. 11) to render the device more stable. In this embodiment the second piece cooperates with the first piece to give the device stability.

In Figs. 13 to 18 is shown another modification. Here the support piece 1 is scored at the lines 45, 47, 49 51 to form a central section 3, end sections 53, 55 and intermediate sections 57, 59.

As in the first and second forms illustrated, the central part is scored at the line 17 so that the projection 29 can be bent forwardly 90 degrees to form a representation of the top of the article whose shell or sides are depicted by the second piece 33.

The intermediate parts 57, 59 are scored at the lines 61, 62, 63, 64 and are cut at the lines 65, so that when the lower projection 67 is bent forwardly at a right angle with respect to the plane of the respective intermediate section 57 or 59, the section 71 becomes horizontal and the section 73 becomes vertical, forming a small platform or step which may be utilized in various ways.

Stability is derived through the bowed piece 33, in its locked relation to the support 1. Stability is also given to the structure by virtue of the angular arrangement of the central part 3 with respect to the intermediate parts 57, 59 and by virtue of the portions 67 which are horizontal when the device is in display position (Figs. 16, 17 and 18).

The articles of all three types herein illustrated may be shipped flat, and may be readily folded into shape, for use by comparatively unskilled labor.

From the above it will be seen that the several objects of the invention are attained and other advantageous results achieved.

As many modifications of the embodiments above illustrated might be made without departing from the spirit or scope of the present invention, it is intended that the above description and accompanying drawings and claims shall be interpreted as illustrative and not in a limiting sense.

I claim:

1. An advertising device comprising a one-piece support and a one-piece second piece, projections on said support having an interlocking engagement with said second piece whereby said second piece may be locked in bowed position upon said support, to represent a curved article such as a can; the support having a projection adapted to be folded forwardly to cooperate with the bowed second piece to represent the top of the article.

2. An advertising device comprising a one-piece support and a one-piece second piece, said support having tongues cooperating with slots in said second piece whereby said second piece may be locked in bowed position upon said support, to represent a curved article such as a can; the support having projections adapted to be folded forwardly to cooperate with the bowed second piece to represent the top and bottom of the article.

3. An advertising device comprising a one-piece support and a one-piece second piece, said second piece being adapted to be locked in bowed position upon said support, to represent a curved article such as a can; the support having a projection adapted to be folded forwardly to cooperate with the bowed second piece to represent the top of the article; said support having four score lines extending from top to bottom of the support and dividing the article into five parts, each outer line and adjacent inner line converging toward the top, the part included between the inner lines being at an angle to the vertical and adapted to carry said second piece locked thereon, the parts outside the outer lines being in approximately vertical position and in approximate alinement with each other when the device is set up for display, the intermediate parts forming an angle with the center part and with the outer parts and connecting the outer parts with the center part.

4. An advertising device comprising a one-piece support and a one-piece second piece, said second piece being adapted to be locked in bowed position upon said support, to represent a curved article such as a can; the support having projections adapted to be folded forwardly to cooperate with the bowed second piece to represent the top and bottom of the article; said support having score lines extending from top to bottom of the support and dividing the article into a plurality of parts, the part included between the inner lines being at an angle to the vertical and adapted to carry said second piece locked thereon, the parts outside the outer lines being in approximately vertical position and in approximate alinement with each other when the device is set up for display, the intermediate parts forming an angle with the center part and with the outer parts and connecting the outer parts with the center part.

In testimony whereof, I have signed my name to this specification this 5th day of June, 1924.

GEORGE HORNECKER.